United States Patent [19]

McEvilly

[11] Patent Number: 4,516,206

[45] Date of Patent: May 7, 1985

[54] POST-PROCESSING OF SEISMIC PARAMETER DATA BASED ON VALID SEISMIC EVENT DETERMINATION

[76] Inventor: Thomas V. McEvilly, 733 Alvarado Rd., Berkeley, Calif. 94705

[21] Appl. No.: 435,596

[22] Filed: Oct. 21, 1982

[51] Int. Cl.³ ............................................... G01V 1/30
[52] U.S. Cl. ...................................... 364/421; 367/40
[58] Field of Search ................... 364/421; 367/31, 40, 367/75

[56] References Cited

U.S. PATENT DOCUMENTS 3,930,145 12/1975 Fort et al. ........................... 364/421
4,314,347 2/1982 Stokely ............................... 364/421
4,422,165 12/1983 Thomas et al. ..................... 364/421

OTHER PUBLICATIONS

McEvilly et al., "ASP: An Automated Seismic Processor for Microearthquake Networks" University of California, Sep. 23, 1981, Bulletin of the Seismological Society of America, vol. 72, No. 1, pp. 303–325, Feb. 1982.
Majer et al., "Monitoring an Underground Repository with Modern Seismological Methods" International Journal Rock Mechanics.
Mineral Science and Geomechanics, Abstract vol. 18, pp. 517–527, 1981.
McEvilly et al., "Automated Seismic Processor", Annual Report 1980, Earth Science Division, Lawrence Berkeley, Jul. 1981.

Primary Examiner—Jerry Smith
Assistant Examiner—Clark A. Jablon
Attorney, Agent, or Firm—Laubscher Philpitt & Laubscher

[57] ABSTRACT

An automated seismic processing system and method are disclosed, including an array of CMOS microprocessors for unattended battery-powered processing of a multi-station network. According to a characterizing feature of the invention, each channel of the network is independently operable to automatically detect, measure times and amplitudes, and compute and fit Fast Fourier transforms (FFT's) for both P- and S- waves on analog seismic data after it has been sampled at a given rate. The measured parameter data from each channel are then reviewed for event validity by a central controlling microprocessor and if determined by preset criteria to constitute a valid event, the parameter data are passed to an analysis computer for calculation of hypocenter location, running b-values, source parameters, event count, P- wave polarities, moment-tensor inversion, and Vp/Vs ratios. The in-field real-time analysis of data maximizes the efficiency of microearthquake surveys allowing flexibility in experimental procedures, with a minimum of traditional labor-intensive postprocessing. A unique consequence of the system is that none of the original data (i.e., the sensor analog output signals) are necessarily saved after computation, but rather, the numerical parameters generated by the automatic analysis are the sole output of the automated seismic processor.

4 Claims, 14 Drawing Figures

TABLE 1
BOSS AND WORKER PARAMETERS SHOWING DEFAULT VALUES IN PARENTHESES. BOSS VALUES ARE FLOATING-POINT ($<10^{38}$) WHILE WORKER NUMBERS ARE INTEGER

LEVEL 1 PARAMETERS

NMIN (1) = Minimum number of PT values needed in time window TW before any processing is started in the BOSS.

TW (2) = Time window in seconds.

DTMAX (8) = Maximum average S-P time in seconds accepted for an event. If greater than, no location is done.

NB (3) = Number of events with S times before a b value is calculated.

SLMIN (1) = Minimum SQ/PQ accepted before S times are used in event location.

MINPTDF (0.1) = Minimum PT difference ($PT_{last} - PT_1$) accepted for an event before any further processing is done in the BOSS, i.e., this is calculated after the NMIN criteria is met. ("Deglitching" parameter).

LEVEL 2 PARAMETERS

VP (5) = P-wave velocity, in same units as station coordinates.
VPVS (1.7) = P-wave velocity to S-wave velocity ratio.
PVC (3) = Velocity for elevation correction for PT times.
SVC (2) = Velocity for elevation correction for ST times.
PQMIN (5) = Minimum PQ (P quality) accepted before FFT values are processed.
SQMIN (8) = Minimum SQ (S quality) accepted before FFT values are processed.
W (1) = Weighting factor for S times in location program.

WORKER PARAMETERS

N (16) = Window length, either 16, 32.
KP (4) = P trigger level parameter (in range 2-10), i.e., PTRIG = KP × LTA.
KS (2) = S trigger level parameter (in range 2-10), i.e., STRIG = KS × PA.
LS (12) = S time threshold (in range 10-16); (LS/8) × PA = ST timing point.
TTH (12) = P time threshold (in range 10-16); (TTH/8) × LTA = PT timing point.
G (1) = Gain correction factor for amplifiers, 60 dB = 1, maximum value 32768.

VARIABLE DEFINITIONS

PSUM = 64-point sum following PT
SSUM = 128-point sum following ST
PA = (PSUM/(64 × GAIN))
SA = (SSUM/(128 × GAIN))
PQ = (PSUM/(64 × LTA))
SQ = (SUM/(128 × LTA))
ST = (ST-16 × ((STA-STLEV)/(STH-STL)))
STLEV = ST timing point $STH = \sum_{t}^{t} X'(t)/4$, 4-point average after ST $STL = \sum_{t}^{t} X'(t)/4$, 4-point average before ST

Fig. 13

POST-PROCESSING OF SEISMIC PARAMETER DATA BASED ON VALID SEISMIC EVENT DETERMINATION

The Government has rights in this invention pursuant to Contract No. W-7405-ENG-48 [SAN 243] awarded by the U.S. Department of Energy.

STATEMENT OF THE INVENTION

This invention relates to a real-time seismic network processing method and apparatus.

BRIEF DESCRIPTION OF THE PRIOR ART

Various types of automated seismic systems have been disclosed in the prior art, as evidenced, for example, by the U.S. patents to Nelson et al U.S. Pat. No. 3,512,131, Fort et al U.S. Pat. Nos. 3,881,166, 3,883,725, 4,001,769 and 4,021,649, Korn et al U.S. Pat. No. 4,300,135, and Edwards U.S. Pat. No. 4,202,048.

It is well known in the art of conducting microearthquake studies that the process of data analysis and interpretation is quite labor-intensive and time-consuming, with full interpretation often taking a year or more for a full data set from a short survey of an active seismic area. While this may not be seen as a problem by the research scientist, it can be a major consideration in critical investigations such as exploration surveys, earthquake or rock-burst warning systems, volcanic activity monitoring, or complex aftershock sequences. A common thread in the conclusions of these reports is a call for automated network processing, where a central computer-based data acquisition system assumes the task of detecting and timing the incoming microearthquake signals, and then carrying forward either in real-time on the same system, or through some intermediate peripheral disk or tape storage medium, to a second off-line computer, the seismological computations on the captured data. A minimal such approach would produce hypocenter locations and some estimate of magnitudes.

In conventional applications, signals from arrays or networks of seismic sensors are either recorded individually at their specific sites, or else the signals are transmitted to a central recording or processing site. In both cases, the signals are either recorded continuously, or sporadically in an event detection mode. Thus, the signal characteristics are monitored for anomolous conditions perculiar to events of interest, and upon the occurrence of such condition, the signal, which is passed through some type of a time delay to retain the event onset, effects recording of the event on a suitable medium.

Analysis of such seismic event data requires service operations and measurements to be made on the reproduced versions of the recorded signals from each sensor, i.e.:

(1) a verification of the event validity (as opposed to unwarranted transient or noisy signals);
(2) identification of P- and S- wave types, and accurate measurement of their times of arrival;
(3) computation of frequency spectra for both P- and S- waves;
(4) correction of the spectra for instrument response, and characterization of the spectra as to low-frequency level, corner frequency high frequency slope;
(5) measurement of the P- and S- wave amplitudes;
(6) determination of the polarity of the P- wave; and
(7) estimation of the quality of the measurements.

Following these measurements on individual data channels a series of computations are normally carried out on the collective network or any data, including:

(1) estimation of the event location in space and time;
(2) addition of the event to an event catalog;
(3) determination of source parameter such as stress drop, fault dimension and slip;
(4) specification of the fault plane geometry and the principal stress directions;
(5) estimation of the occurrence parameter known as 'b-value';
(6) computation of P and S velocity ratios by the method of Wadati; and
(7) archiving these parameters into some data file.

The above sequence of analysis is very time consuming and labor-intensive if done in a manual mode, or even if performed interactively with a computer. Furthermore, if a digital computer is used for event detection and temporary data storage at the central site, substantial peripheral storage (disk or tape) is needed for even a modest network. This requirement has resulted in the common practice of dedicating a mainframe mini computer with storage peripherals to the data acquisition and processing system, a practice which requires the environmental quality and power availability of a typical computer center.

The present invention is a major departure from the common practice enumerated above in that a low-power system of computers performs all of the above operations in an automatic mode. A unique consequence of this invention is that none of the original data (i.e., the sensor output signals) need be saved after computation, but rather, the numerical parameters generated by the automatic analysis are the sole output of the automated seismic processor. Of course, if desired in some other context, such an auxiliary receiving system could operate in conjunction with the automated seismic processor.

SUMMARY OF THE INVENTION

A primary object of the present invention is to provide a real-time seismic network and processing system and method which continuously monitors a seismometer array, automatically detects and analyzes events, and provides a variety of data for each event. The network includes a plurality of worker stations that supply data to a central processing unit or BOSS, which may include auxiliary processors, as required. Operating in real-time, the system provides immediate event results, offering unprecedented flexibility in optimizing individual station operation or in adjusting the array geometry and detection parameters to suit the particular study objectives.

According to a more specific object of the invention, an automated seismic processing system is provided including an array of CMOS microprocessors for unattended battery-powered processing of a 15-station network (up to 128 stations can be accommodated). No time-series data are saved after the WORKER processors have analyzed an event detected in their particular signal, but the WORKER software performs a wide range of functions including P- and S- wave time and amplitude measurements. Fourier spectra fits for source parameters for subsequent computations by the BOSS processor of moment, dimension and stress drop, fault-plane solution by moment tensor inversion from the polarity and amplitude of P- waves, and incremental and cumulative b-value computation. All processing is completed in less than one minute from declaration of valid event and data are output to printer and/or magnetic tape cartridge. The system accepts use-selecter parameters from the terminal keyboard to establish station coordinates and event discrimination criteria. WORKER operating parameters may also be individually modified from the keyboard.

Each WORKER unit, upon detecting an event, determines times, amplitudes, and quality of P and S components, plus P-wave polarity. Fast Fourier Transforms of windowed P and S phases are computed and fit for low frequency level, corner frequency, and high frequency slope. These "raw data" are transmitted to the BOSS.

The multi-processor system, is comprised of microcomputers arranged with one unit as BOSS and a WORKER unit for each station in the array. The WORKER microprocessors detect events, process them for a variety of parameters and transmit the resulting data to the BOSS unit via the system bus. The BOSS collects data from the WORKERS and performs event discrimination. When an event is determined "valid", the BOSS computes the hypocentral location and other information from the event data set and outputs this to a terminal and/or a tape cartridge. The BOSS processor may include a more powerful MASTER computer which is activated to assist in the final computations.

Utilizing all CMOS technology, the system offers advantages for continuous operation: CMOS reliability and ruggedness plus low power (16 watts for a 15 WORKER SYSTEM), enabling practical battery operation in remote areas or uninterruptible operation in case of AC power outage.

From the keyboard, the user may select any or all of the following event calculations and output:
  a. RAW DATA tabulation
  b. Event count
  c. Running b-values
  d. Hypocentral location
  e. Polarity of first-motion
  f. FFT raw data tabulation
  g. FFT derived source parameter tabulation
  h. FFT averages
  i. Source parameters from Moment Tensor inversion.

According to a further object of the invention, the automated seismic processing system incorporates BOSS-activated high-speed LSI-11 processing with FORTRAN software for advanced location methods and additional parameter analysis including moment tensor inversion and Wadati Vp/Vs functions. This physical redesign optimizes field reliability and ease of maintenance, and provides a flexible user-oriented operator interface system, greatly simplifying initial setup, parameter review of change, and field operations. The system can be installed and operated by personnel with minimal technical skills.

Each WORKER, upon detecting an event, determines times, amplitudes, quality of P and S arrivals, and P-Wave polarity. Fast Fourier Transforms of windowed P and S phases are computed and fit for low frequency level, corner frequency, and high frequency slope. Raw data are transmitted to BOSS. The BOSS processor monitors the WORKERS and performs event discrimination. When an event is declared by BOSS, it energizes a MASTER processor that transmits the WORKER raw-data to the MASTER processor where an event message is printed and then hypocentral locations and other event parameters appropriate to the user-selected modes are computed and listed on the thermal printer and/or the tape cartridge. The system includes a MASTER computer (such as the LSI-11/23 Computer of Digital Equipment Corporation) as the final processor for event source parameters. The standard hypocenter location software utilizes a velocity gradient model with optional station corrections. P- and S- wave spectral parameters and P- wave polarities yield fault-plane solutions through advanced linear inversion techniques (Ref. Stump & Johnson, 1977). The low-power and reliability characteristics of the CMOS technology are not compromised with the use of the LSI-11/23. Innovative design provides power to this unit only as needed for event processing, and then returns it to a monitoring mode in which the array of RCA 1802 WORKER and BOSS microprocessors conducts all detection, timing, spectral, and event declaration tasks, at a nominal power requirement of one watt per data channel.

BRIEF DESCRIPTION OF THE DRAWING

Other objects and advantages of the invention will become apparent from a study of the following specification when viewed in the light of the accompanying drawings, in which:

FIG. 13 is a Table of BOSS and WORKER parameters.

DETAILED DESCRIPTION

Figure 1:
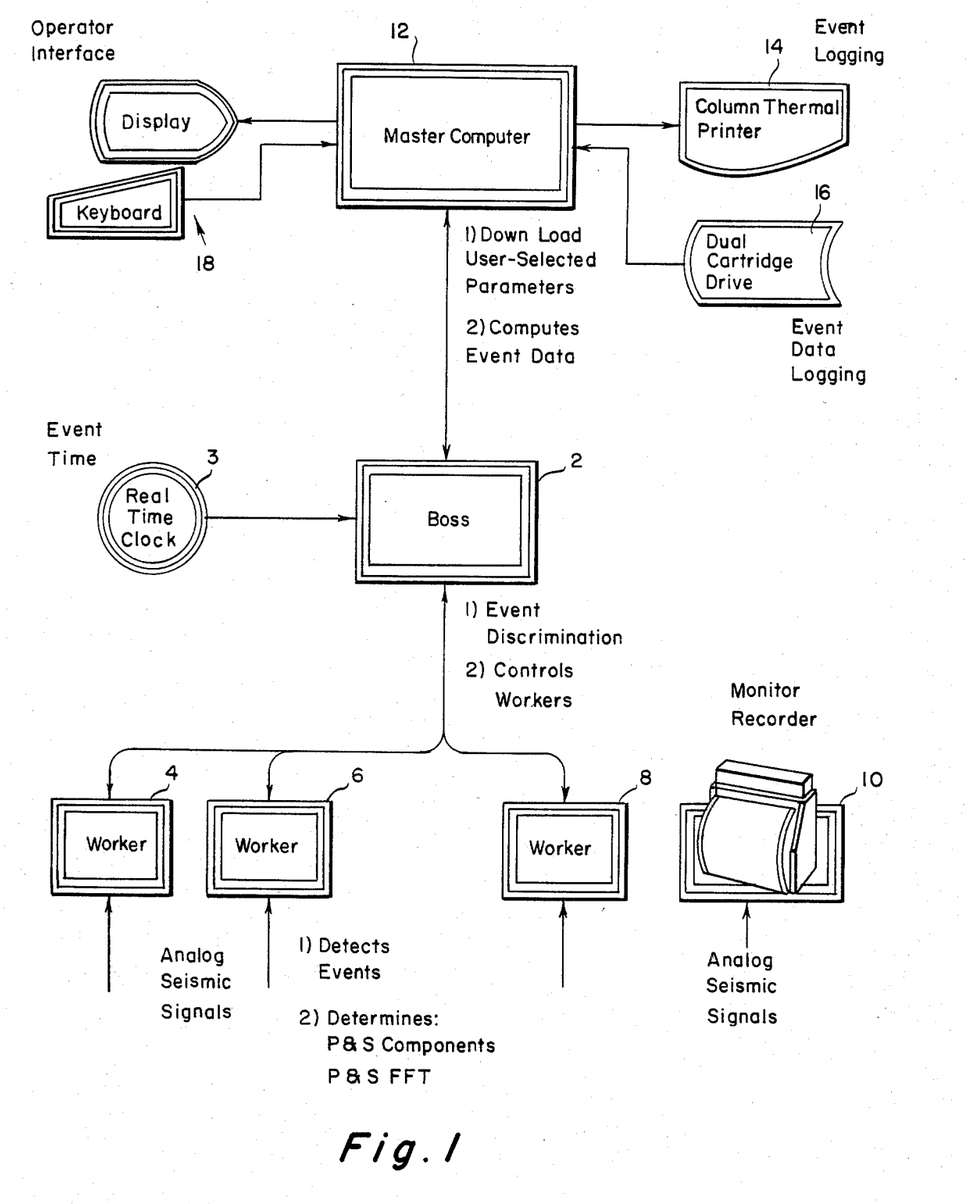
FIG. 1 is a block diagram of the automated event processing system of the present invention.

Referring first more particularly to FIG. 1, the seismic logging system of the present invention includes a system of CMOS microcomputers arranged with a central control unit or BOSS 2 supplied with a clock signal by the real time clock 3, and with inputs from a plurality of sensor stations or WORKERS 4, 6 and 8. Since the system of the present invention provides event analysis in real time, the necessity for saving time-series data is eliminated. In the event that time-series preservation is desired, a monitor recorder 10 may be operated in conjunction with the system to provide archival recording means of detected event time-series.

As will be described in greater detail below, each WORKER, upon detecting an event, determines times, amplitudes, quality of P and S arrivals, and P-wave polarity. Fast Fourier transforms of windowed P- and S-phases are computed and fit for low frequency level, corner frequency, and high frequency slope. Raw data are transmitted to BOSS 2, which monitors the various WORKERS and performs event discrimination. When an event is declared, the BOSS transmits the WORKER raw data to the MASTER computer 12 (for example, an LSI-11/23 computer, manufactured by Digital Equipment Corporation). The hypocentral locations and other event parameters appropriate to the user-selected modes are computed and listed on the 48 column thermal printer 14 and/or the tape cartridge recorder 16. Operator interface with the master computer 12 is provided by the keyboard and display apparatus 18.

The MASTER computer 12 serves as the final processor for event source parameters. The standard hypocenter location software utilizes a velocity gradient model with optional station corrections. P- and S- wave spectral parameters and P- wave polarities yield fault-plane solutions through advanced linear inversion techniques. The low power and reliability characteristics of the CMOS technology are not compromised with the use of the LSI-11/23 MASTER computer. Innovative design provides power to this unit only as needed for event processing, and then returns it to a monitoring mode in which the array of WORKER and BOSS microprocessors (RCA Model 1802) conducts all detecting, timing, spectral, and event declaration tasks, at about one watt per data channel. The use of the MASTER computer allows convenient software modification through FORTRAN programming language.

The system accepts user-selected parameters entered via a prompted menu format. The initial master selection menu allows the operator to obtain subsequent data entry menus. Individual station parameters are easily entered by selecting and correcting desired parameters. The data entry menu facilitates entry of event discrimination criteria as does the menu which provides for input of data needed to compute locations. The mode menu allows selection of the desired computations and outputs. A set of default parameters can be requested which effect a general-purpose microearthquake operating configuration. The desired parameter set can also be entered from a tape cartridge, which can be written off-site, thus completely eliminating operator decision making.

The output modes an operator may select include:
Mode A—Worker raw data set (debug mode)
Mode B—Event count and time with print option selected:
    Average P and S amplitudes
    Average S-P time
    S-P time histogram
    Nearest station
Mode C—Running b values, cumulative and interval
Mode D—Hypocentral location
Mode E—P-Wave Polarities
Mode F—
    P-Wave FFT raw data
    S-Wave FFT raw data
Mode G—FFT-derived source parameters for each station
Mode H—Average of FFT-derived P-Wave source parameters Average of FFT-derived S-Wave source parameters
Mode I—Principal stress directions (fault-plane solution) with moment tensor components
Mode J—Wadati Vp/Vs value.

In typical operation, event time and locations are listed on an on-line thermal printer as an event log, with selected data stored on cartridges. The operator and analyst thus have a convenient event directory for easy data retrieval, for monitoring detection performance (for example, with respect to a single-component continuously recording chart recorder) or for assessing the effectiveness of the station configuration.

Figure 2:
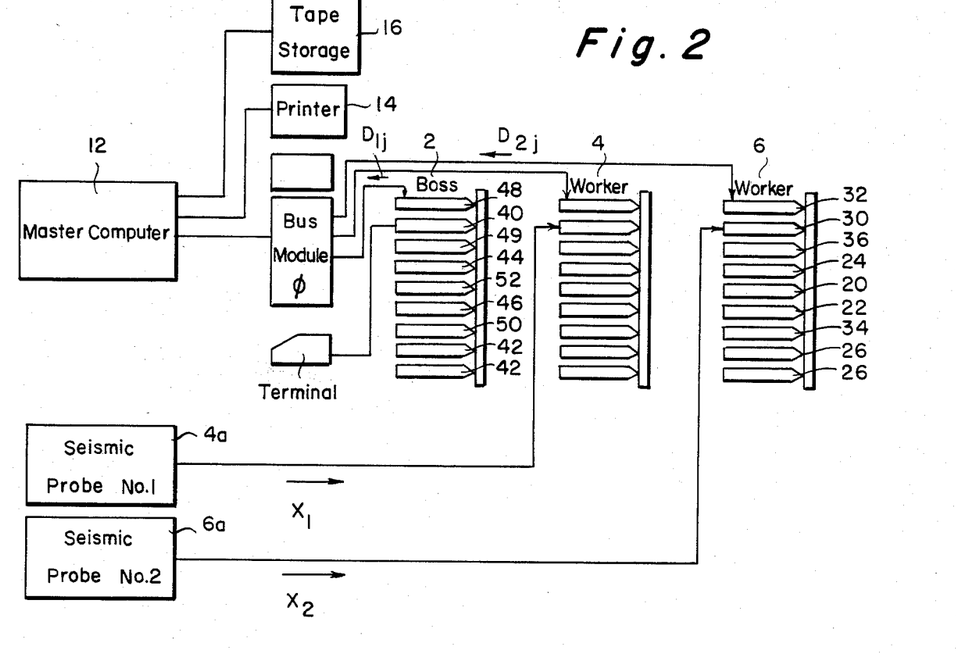
FIG. 2 is a block diagram of a two-channel seismic data acquisition/processing embodiment of the invention showing card structures for the master (BOSS) and channel (WORKER) modules.
Figure 3:
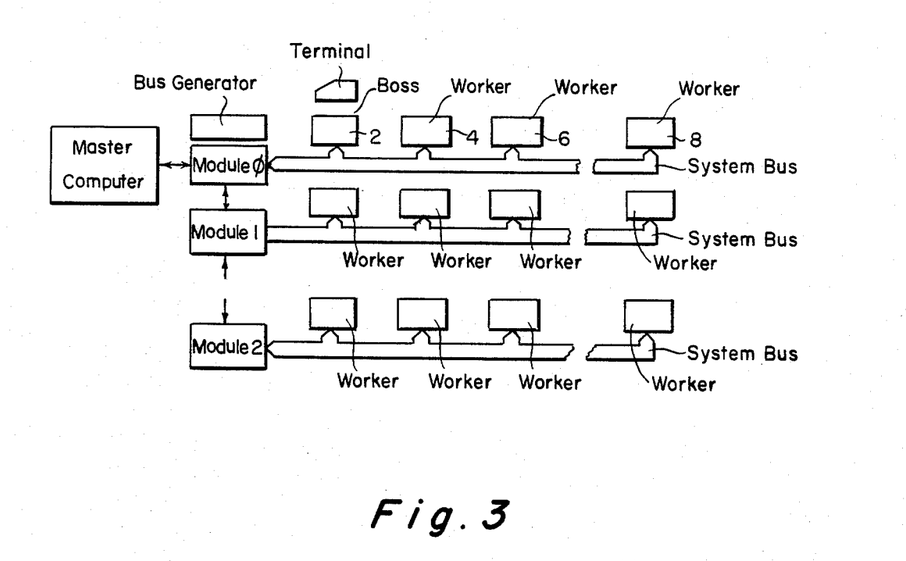
FIG. 3 is a block diagram of a 128-channel seismic field system, illustrating 16-channel modular architecture.

Referring now to FIG. 2, the seismic detection system is designed as a parallel processing device with a dedicated CMOS microcomputer monitoring each incoming channel of data. As indicated above, each dedicated-channel microcomputer, or WORKER (4,6, having seismic probes 4a, 6a, respectively) feeds processed data to a central microcomputer, or BOSS 2 which controls the network and initiates multi-station data analysis by the MASTER computer 12. FIG. 3 shows the modular architecture of the system. A total of 127 WORKERS can be handled by a single BOSS (i.e., 128 individual processors).

The principal function of each WORKER is to monitor the incoming time series of a data channel. The sequence of operations in the disclosed embodiment is: (1) the time series X $(t_i)$ is digitized at 100 samples/sec with 12 bit resolution; (2) the mean is removed from the time series; (3) a new time series X'$(t_i)$ is formed by $$X'(t_i) = \frac{\sum_{j=i-n}^{i} |X(t_j)|}{n}$$

with n=previous 16 or 32 points; (4) a long-term average (LTA) of 4096 points and a short-term average (STA) of 16 points are taken on X'$(t_i)$; and (5) if the STA exceeds the LTA by a specified constant, i.e., if STA=$C_1 \times$LTA, then a "trigger" point is found; if not, the WORKER waits for a new digitization point and the sequences start over again. At any one time, 512 points of the original demeaned time series plus the STA and LTA values are saved. Since a trigger point will always be later than the true arrival time, the last time at which the STA exceeded the LTA of X'$(t_i)$ by a specific constant, $C_2$, is taken as the P-wave arrival time PT. Because $C_2$ is always less than $C_1$, PT will always precede the P-trigger time for a variable amount, depending upon the impulsiveness of the triggering signal.

Figure 4:
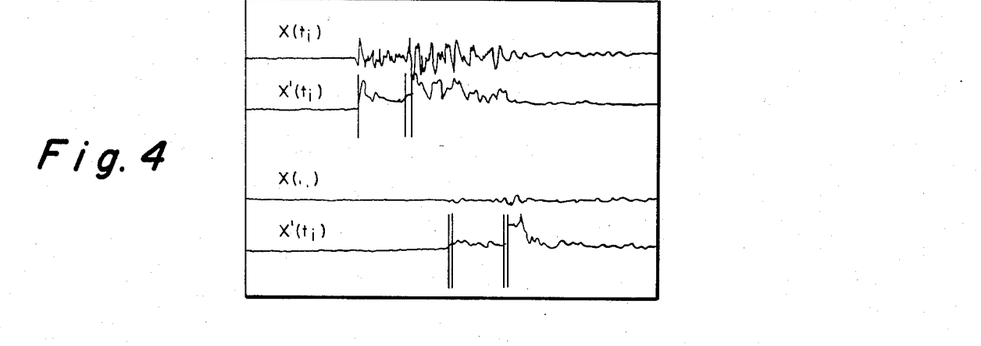
FIG. 4 is a waveform diagram illustrating examples of P- and S- wave detection and timing for impulsive and emergent signals.

Referring now to FIG. 4, two examples are presented of the triggering and the picking process for an impulsive and emergent event. Of the four vertical lines shown on each X'$(t_i)$, the first two are the P-wave pick and the P-trigger point, respectively, while the second two vertical lines shown the S-wave time and S-wave trigger point. Although similar to the P-wave algorithms, the S-wave detection is slightly different. After a P time is found, the next 64 points of $X'(t_i)$ are averaged to form a new LTA (called the P amplitude, or PA). When the STA of $X'(t_i)$ exceeds PA by a specified amount, i.e., if STA$\geq C_3 \times$PA, then S trigger is declared. From this point, a line is extrapolated back along $X'(t_i)$ with a slope calculated by using the mid-point of the preceding four points and the mid-point of the four point preceding these four points. The S-time arrival, ST, is the time at which this line intersects the level $C_4 \times$PA. The default values of $C_1$, $C_2$, $C_3$, and $C_4$ are: 4, 1.5, 2, and 1.5, respectively. At this stage, both P and S waves are timed, DT, the S-P time, is computed, and the P amplitude has been measured. Next, the average values of the 128 $X'(t_i)$ points following the S time give the S amplitude, SA. Estimates of P- and S-wave quality, PQ and SQ, are calculated as PQ=PA/LTA, SQ=SA/LTA, where LTA is the last 4096 point LTA before the P trigger.

The polarity of the P wave is found by comparing the sum ($S_1$) of the four data points preceding the P time, and the sum ($S_2$) of the four data points following the P time of the original demeaned data. The sign of PP=$(S_2 - S_1)/|S_1|$ is the first motion polarity (+ =up, − =down). The magnitude of PP is the quality of the polarity estimate.

Variable length windows for FFT computations are then placed around the P and S waves. Available window lengths are 64, 128, and 256 points for the P wave and 128, 256, and 512 points for the S wave, selected automatically for S-P times, of 0 to 1, 1 to 2, and greater than 2 sec, respectively. If no S wave is found, a 128-point window is used for the P wave. Demeaned data are held in these windows for subsequent spectral analysis.

Fast Fourier transforms are calculated for the windowed P and S waves using an algorithm from Brigham (1976). Ten and 25 percent cosine tapers are applied to the front and back of the data windows, respectively. The computed spectra are corrected for instrument response and fit for long-period level, corner frequency, and high-frequency slope. The amplitude response of a $\gamma$-pole low-pass Butterworth filter, $$A = \frac{A_o}{[1 + (f/f_o)^{2\gamma}]^{1/2}}$$

is fit to a spectrum for best long-period level, PLP or SLP, the slope $\gamma$ as PGI or SGI, and corner frequency, $f_o$ as PFO or SFO. As constraints, 1 5, and $f_o$ must not lie in the first or last five spectral values.

For each event there is thus a series of calculated values which can be sent from WORKER to BOSS. These values are indicated as $D_{1i}$ and $D_{2j}$, for i and j data parameters determined by WORKERS 1 and 2, respectively. These values are PT, PA, PQ, ST, SA, SQ, DT, PP, and the spectral parameters LP, GI, and FO for both P and S (i.e., PLP and SLP, etc.).

A WORKER can be aborted at certain times in its calculation if the BOSS routine determines that too few stations recorded the event during a specified time window or that the time between the first and last P times was too small, i.e., a noise spike on the system. Upon abortion, the WORKER returns to the detection mode if its signal level has remained below the trigger level for 256 consecutive samples, and if BOSS is not busy.

An event is determined to be over when the signal level remains below the P-trigger threshold for 256 samples. This can occur even without an S-wave detection. If the level remains above the trigger threshold for six minutes a new LTA is calculated and the WORKER resets itself and resumes looking for another event.

Figure 5A:
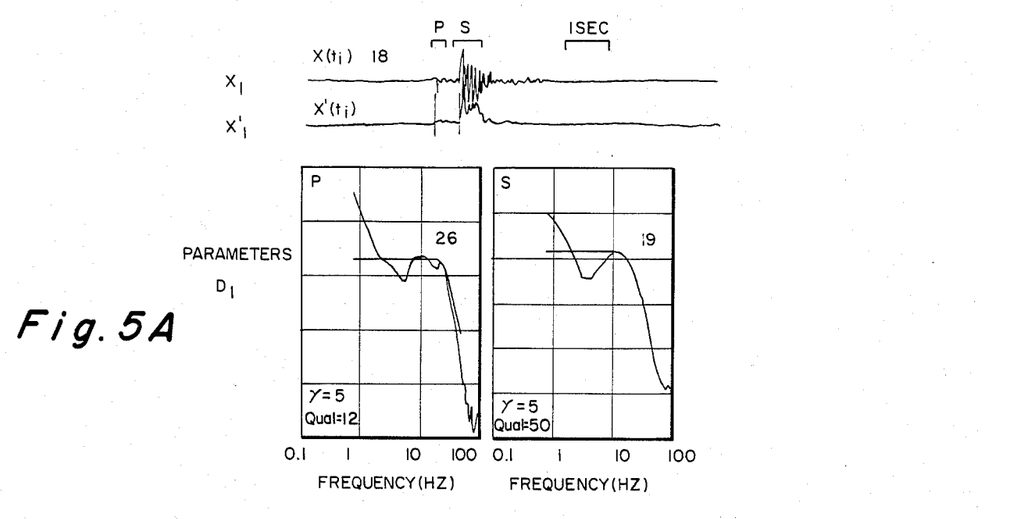
FIGS. 5A and 5B are waveform diagrams illustrating the use of the automated seismic processing techniques of the present invention for processing two different events.
Figure 5B:
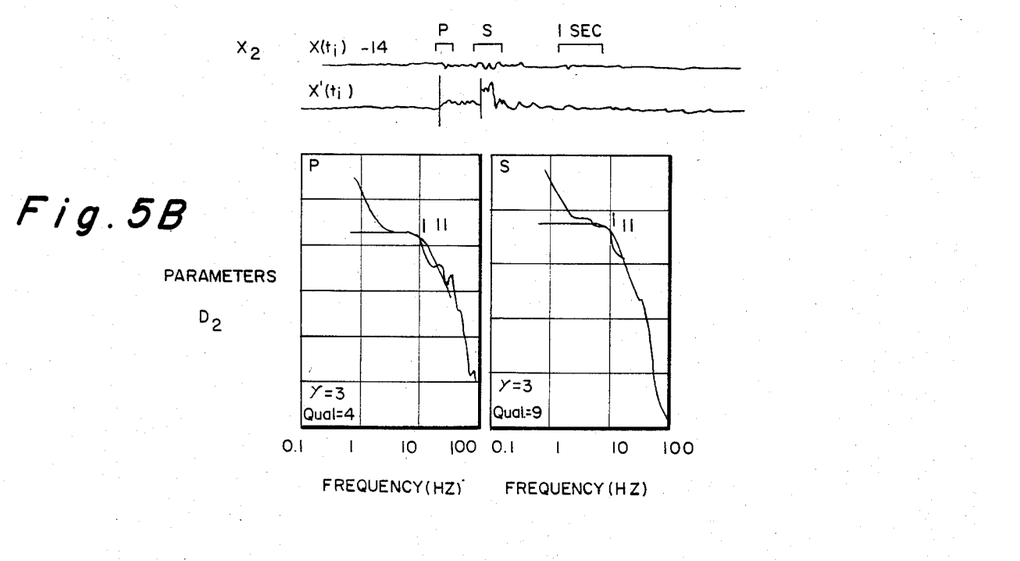

All WORKERS will remain in HOLD while BOSS is calculating. While in HOLD the WORKERS can complete their sequence of calculation but cannot resume the detection mode until released by BOSS. This allows the BOSS to complete its calculations, output the data to the MASTER computer, and prepare to accept a new set event data from the WORKERS. The total time for all WORKER operations for a typical microearthquake with S-P time less than 3 seconds is 10 to 20 seconds depending upon FFT lengths. FIGS. 5A and 5B illustrate two examples of summarizations of WORKER calculations.

In the system architecture each WORKER is capable of addressing 64K bytes of memory. Each WORKER as presently configured in the illustrated embodiment, however, contains only 12K of PROM and 4K of RAM, for a 16K memory size. Also, only 12-bit analog-to-digital converters were readily available in CMOS at the time of the design, although 16-bit arithmetic is used throughout ASP, and thus higher resolution converters can be used when available. Integer arithmetic only, in twos-complement, is used throughout WORKER software, with division and multiplication in powers of 2 wherever possible. The FFT speed of 3 seconds for 512 points is achieved by using a specially designed hardware multiplier board, with table look-up for sine and cosine values.

Although the individual WORKER calculations are fairly routine steps, the overall concept of discarding the original time series after a certain amount of on-line processing is not a usual practice. The operating parameters for the computations just described could be specified such that, for routine microearthquake network analysis, all results of interest would be output directly or could be reconstructed from the output, and at least 90% of the usable events would be processed. Extensive testing, using synthetic and real data, has been carried out to gain confidence in the software. Data of varying quality were processed both automatically and by conventional techniques and then compared to develop the optimal algorithms. Only after thousands of events were run was enough confidence obtained to accept the resulting software. Based on travel-time residuals in field tests, the picking routines proved to perform as well or better than an experienced analyst for the P-wave arrival, and almost as well in S-wave picking. Moreover, the subjective human factor has been eliminated.

BOSS, as the name implies, is responsible for overall system operation, event discrimination, and for initiating the integrated auxiliary computer in the final calculations. To maintain overall system management on the message bus the BOSS has the highest priority (priority of 0), while each WORKER is assigned a specific priority (e.g., 1-NS, the number of WORKERS on line) to insure smooth handling of messages.

In the illustrated embodiment, processing by BOSS proceeds as follows:

Upon event detection, each WORKER sends PT, PA and PQ. BOSS stores data and begins counting. If a minimum number (NMIN) of these "P messages" are received within a specified time window (TW), BOSS will wait until $T \times TW$ to collect additional P messages and until 3×TW to collect additional S messages (ST, SA, SQ, DT). After 3×TW all incoming P or S messages are ignored. FFT and P-wave polarity data, however, are accepted until 2×TW plus 20 sec. NMIN and TW will vary depending upon the array size, the number of earthquakes occurring, noise background, and the velocity model. Default values of NMIN and TW are 1 station and 2 sec, respectively. NMIN is usually set to about 5 for a 12- to 15-station array.

After 3×TW plus 20 sec, BOSS valid event data are passed to the MASTER computer, which begins calculating according to the modes of calculation the user has specified.

Selected modes are (A) DEBUG; (B) EVENT COUNT; (C) B VALUE; (D) LOCATION; (E) POLARITY; (F) FFT RAW DATA; (G) FFT STATION DATA; (H) AVERAGE FFT DATA; (I) MOMENT TENSOR; and (J) Vp/Vs.

(A) DEBUG

DEBUG prints out all data from the WORKERS in the specified time windows. A typical output from an event is recorded on four stations. For each event judged valid, the word "EVENT" is printed with a time identification. The sequence of messages from a WORKER is P message (PT, PA, PQ); S message (ST, SA, SQ, DT); F message [PFFT parameters, PSL, PLP in floating point format $PLP \times 2^{PEX}$, and PGI, PGF as integer and fraction, PGI.[(PGF/32767)]; G message (FFT information for the S wave); Q message (polarity PP as sign and quality). All numbers are input and output as mantissa and exponent, i.e., the number 46789 would be 46789 +05.

(B) EVENT COUNT

Mode B lists the number of events from turn-on or reinitialization that have met the occurrence criteria (NMIN stations in TW seconds, and maximum PT difference greater than MINPTDF). An optional printout, illustrated in FIG. 5, can be selected to list the average S-P time for the event (DTAV), average P- and S-wave amplitudes (PAAV and SAAV), the station with the earliest P time (PT1), and the number of events up to that time that have had average S-P times between 0 to 1 sec (NDT0), 1 to 2 sec (NDT1), 2 to 3 sec (NDT2), and greater than 3 sec (NDT3).

(C) RUNNING b VALUES

This mode calculates the maximum likelihood b value after NBT events. Using the amplitudes PAAV and SAAV, according to $$\frac{\log e}{\frac{\sum\limits_{NBT} \ln PAAV}{NBT} - \ln PAAV_o}$$

where $PAAV_o$ is the minimum amplitude in the set of NBT values of PAAV. Both cumulative (BPC or BSC) and interval (BP or BS) b values are calculated. To obtain an accurate estimate of the b value, it is necessary to place a lower limit on acceptable $PAAV_o$ (or $SAAV_o$), insuring uniform detection and use of the "linear" portion of the distribution curve.

(D) LOCATION

A simple location program was incorporated for the initial location. The method is a noniterative constant velocity computation used widely in acoustic emission work and described by Inglada (1928).

Starting from the initial location, the hypocenter is then located by a non-linear least square program using for the velocity model a gradient layer over a half space.

After the event has been located, the hypocentral distance, azimuth (clockwise from north), take-off angle, and P- and S- time residuals are calculated for each station. There are two operating versions for location, one for a three-dimensional array and another for a two-dimensional array of stations. In the three-dimensional array, a constant velocity whole space is assumed.

(E) POLARITY

The polarity determined for each P wave at each WORKER is printed out, +=up, −=down, with the magnitude being a measure of the quality of the event.

(F) FFT RAW DATA

The spectral values of corner frequency, long-period level, and slope are output as Hertz, micron-seconds, and integer-plus-fraction, respectively.

(F) FFT STATION DATA

Using the spectral parameters for P and S and the location for each station, source parameters are calculated following Brune (1970, 1971)

$M = 4\pi R \rho V^3 \Omega_o$
$r = 2.34 \, v/2 \, \pi f_o$
$\Delta_o = 7 \, M_o/16 \, r$
$w = M_o/\pi \rho v^2$
R = hypocentral distance
$\rho$ = density = 2.67 gm/cm$^2$
V = velocity
$\Omega_o$ = long-period spectral level
$f_o$ = corner frequency
$M_o$ = moment
r = fault radius
$\Delta\sigma$ = stress drop
w = fault slip.

(H) AVERAGE FFT DATA

Averaged values of moment, radius, stress drop, displacement, and slope are obtained for each event.

(I) MOMENT TENSOR

P-Wave polarities and P-Wave moment values are used in an inversion calculation to estimate the principal stress directions and the magnitudes of the zero-order moment tensor components.

(J) Vp/Vs

The ratio Vp/Vs of the P- and S- Wave velocities in the medium are determined by the method due to Wadati using the times of P and S-P interval at all stations detecting them for each event.

Any or all of the above modes can be selected and computed in any order so long as location parameters have been computed prior to their use in a subsequent mode. In practice DEBUT is not used routinely, due to the time and paper required to print out the extensive data. Because we have replaced the RCA floating point software with a much faster Advanced Microdevices 9511A arithmetic processor chip, the processing time between events is less than 45 sec when all 15 stations record the event. When a 9600-baud output device (e.g., cassette) is used, the total time between events is less than a minute. The flexibility afforded by the FORTRAN programmability of the MASTER computer allows for modifications of the computational details of any of these modes, but the basic data parameters provided to BOSS by the WORKERS remain as described previously.

Referring again to FIG. 2, each WORKER of the illustrated embodiment includes certain conventional components, such as the CPU board 20, the address latch 22, the I/O decoder 24, and the 4K CMOS RAM 26. It also includes certain additional equipment developed in accordance with the present invention, including the analog-to-digital converter 30 (FIG. 8), the bus interface boards 32 (FIGS. 6 and 7), the programmable memory board 34 (FIG. 10), the 16×16 multiplier board 36 (FIG. 9), and the status display board. With three programmable memory boards in each WORKER (12K), there is a total of 12 boards per WORKER.

The CPU board contains the 1802 microprocessor which is modified for manual reset and provides a strobe pulse for proper PROM operation. The Address Latch and Bank Select card enables each 4K of memory. The I/O Decode allows the RCA two-level input/output to operate seven I/O ports each with seven I/O lines. The RAM provides for temporary storage of constants.

Figure 8:
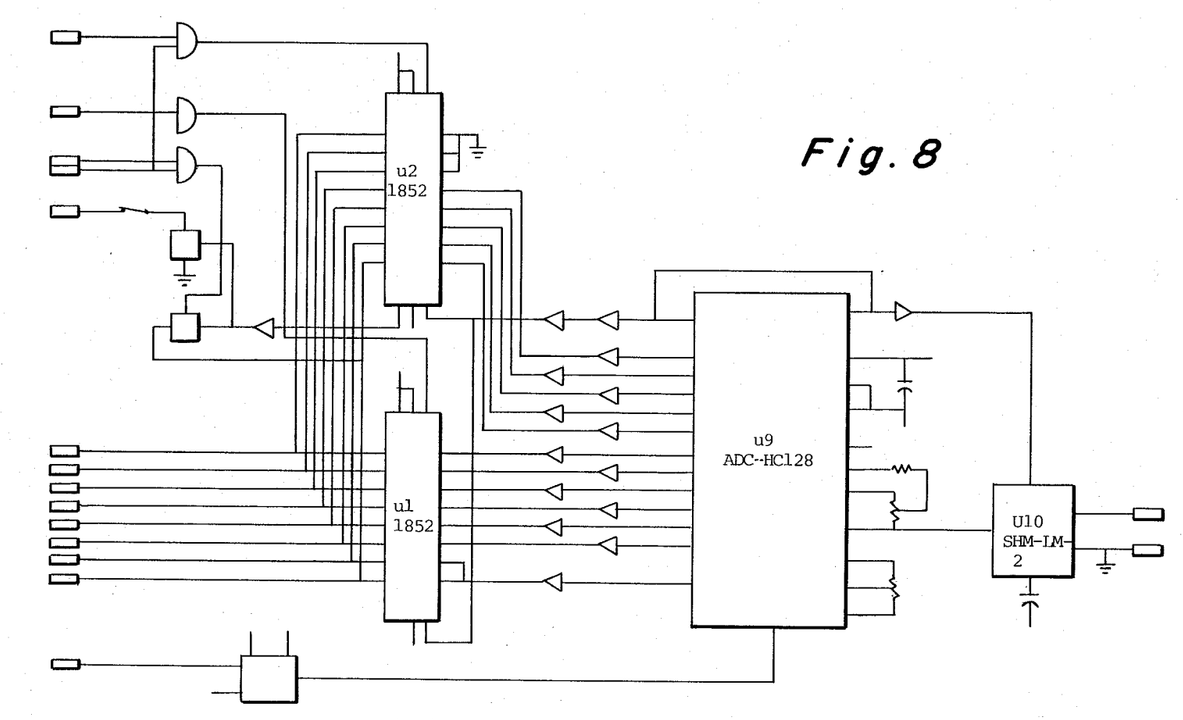
FIG. 8 is a block diagram of one embodiment of the analog to digital converter board for digitalizing the incoming analog signal upon command from a WORKER central processing unit.

The Analog-to-Digital Converter board uses a 12-bit CMOS Datel unit (ADC-HC12B) with a Datel (SHM-LM-2) sample-and-hold unit. It operates at 100 samples/sec with a full scale input of ±5 V, for a 2.5-mV least-significant bit.

Figure 6:
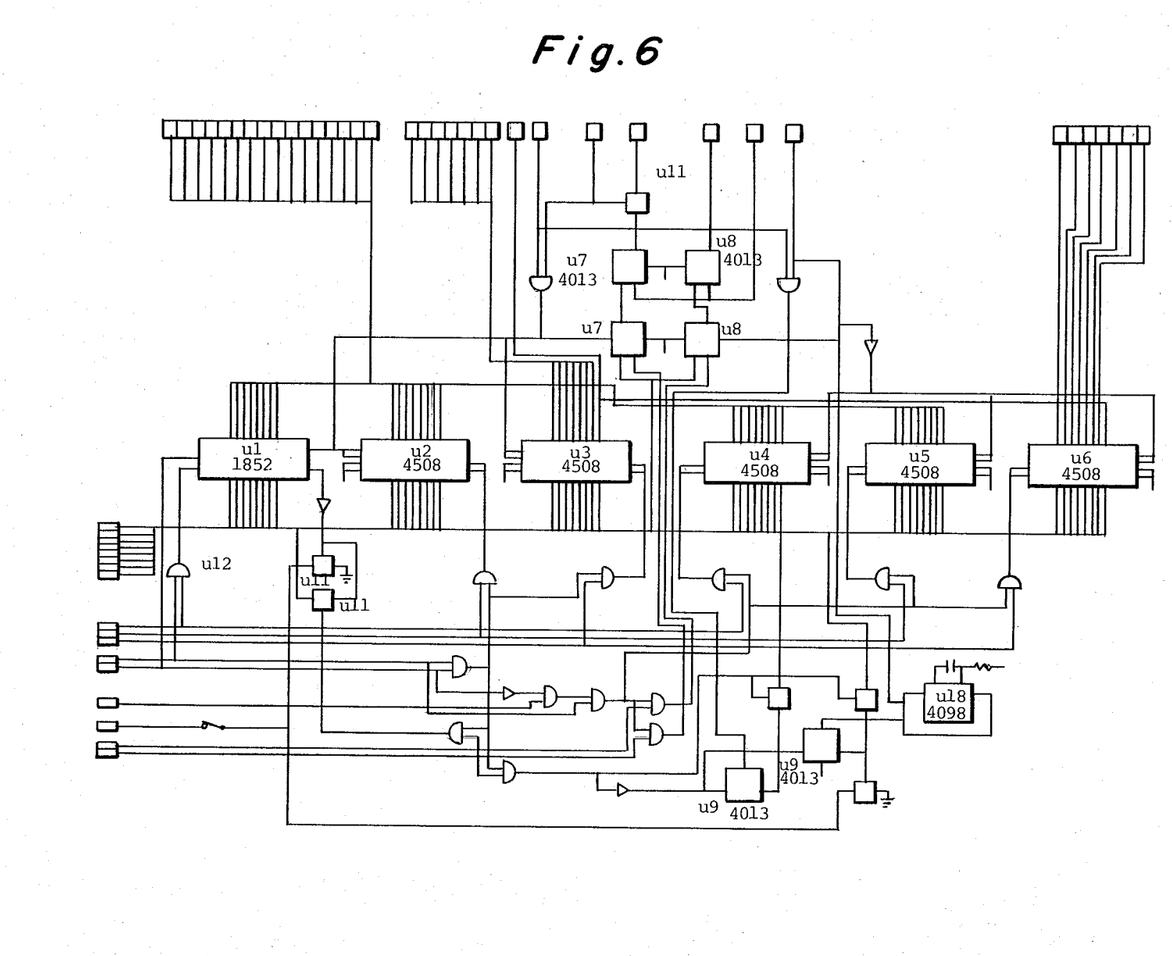
FIGS. 6 and 7 are block diagrams of one embodiment of the bus interface modules which provide 2-way communication between each WORKER and BOSS module.
Figure 7:
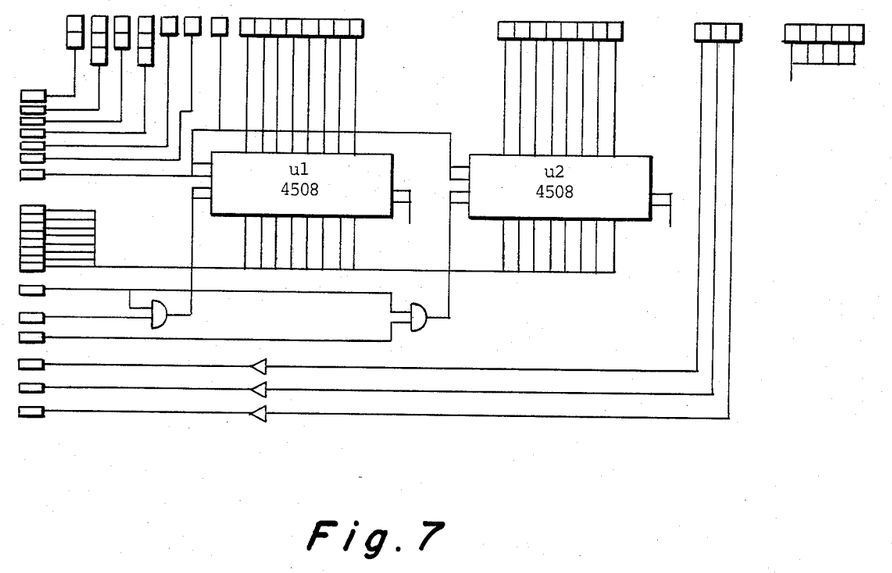

The Bus Interface boards handle the 16-bit data bus, 7-bit source address bus, 7-bit destination code, 16-bit time code, the CPU clock, the ADC sample command, and the T time latch, distributing the time code and the individual messages to each computer (source, bus request, and destination). Each Bus Interface board is connected via flat cable to a interconnect panel through which the bus messages are distributed.

Figure 9:
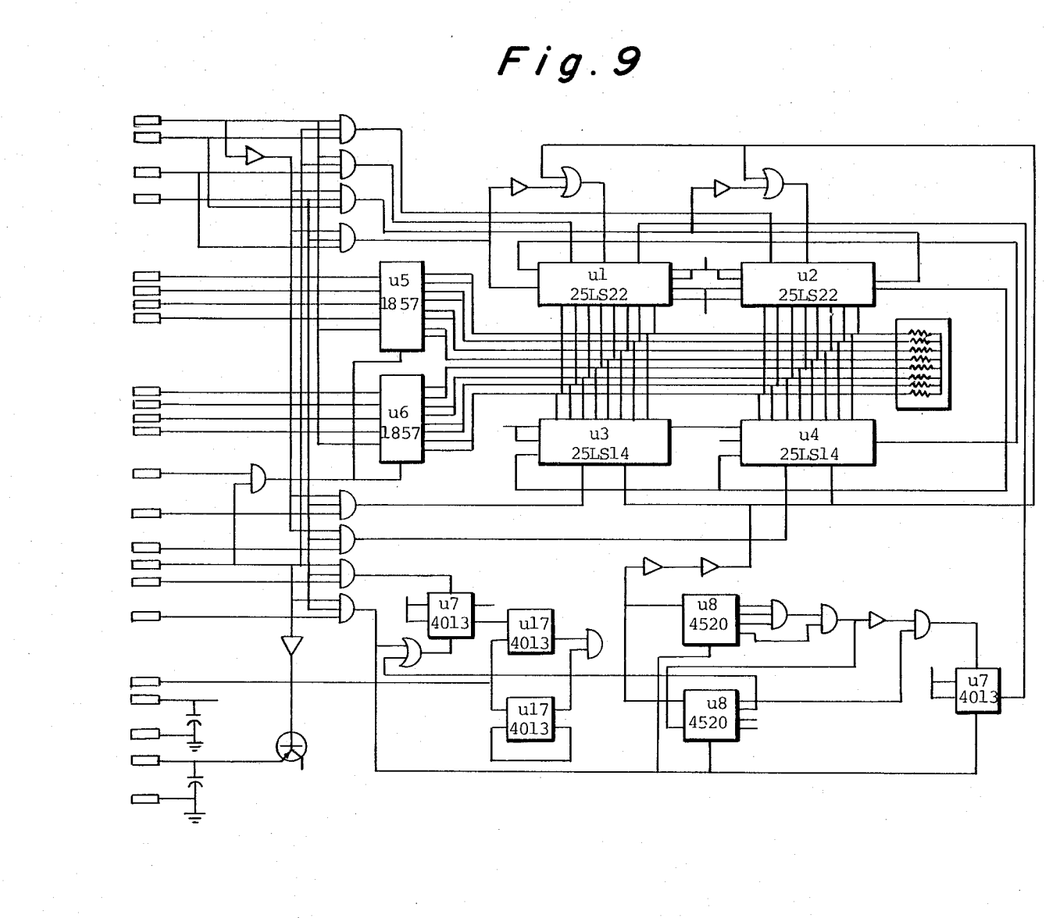
FIG. 9 is a block diagram of one embodiment of the multiplier board for multiplying two 16-bit integers provided by the central processing unit.
Figure 10:
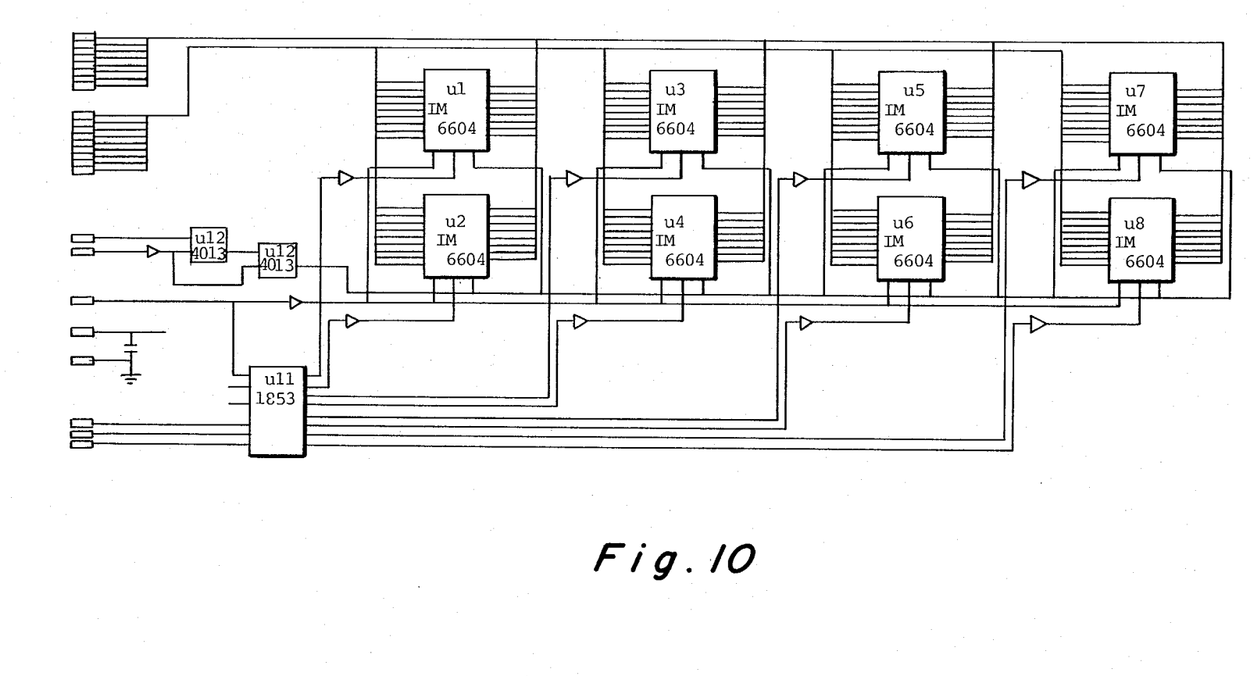
FIG. 10 is a block diagram of one embodiment of the programmable memory for storing the processing software used by the BOSS and WORKER modules.

Each PROM board houses 4K of memory using CMOS Intersil IM 6654 IJG UV erasable PROMS (512×8) with an access time of 280 nsec. The Multiplier board is the only non-CMOS board in WORKER. Based on the Advanced Microdevices 25LS14 with a 25LS22 shift register, it performs a 16×16 bit integer multiply in 30 sec, and is powered up on demand.

The Status Display board controls a bank of LEDs to indicate the program position in WORKER. The various status lights are: ACTIVE, WAITING FOR EVENT, P-EVENT, S-EVENT, CALCULATE FFT, ABORT, WAITING FOR END, and HOLD.

Figure 11:
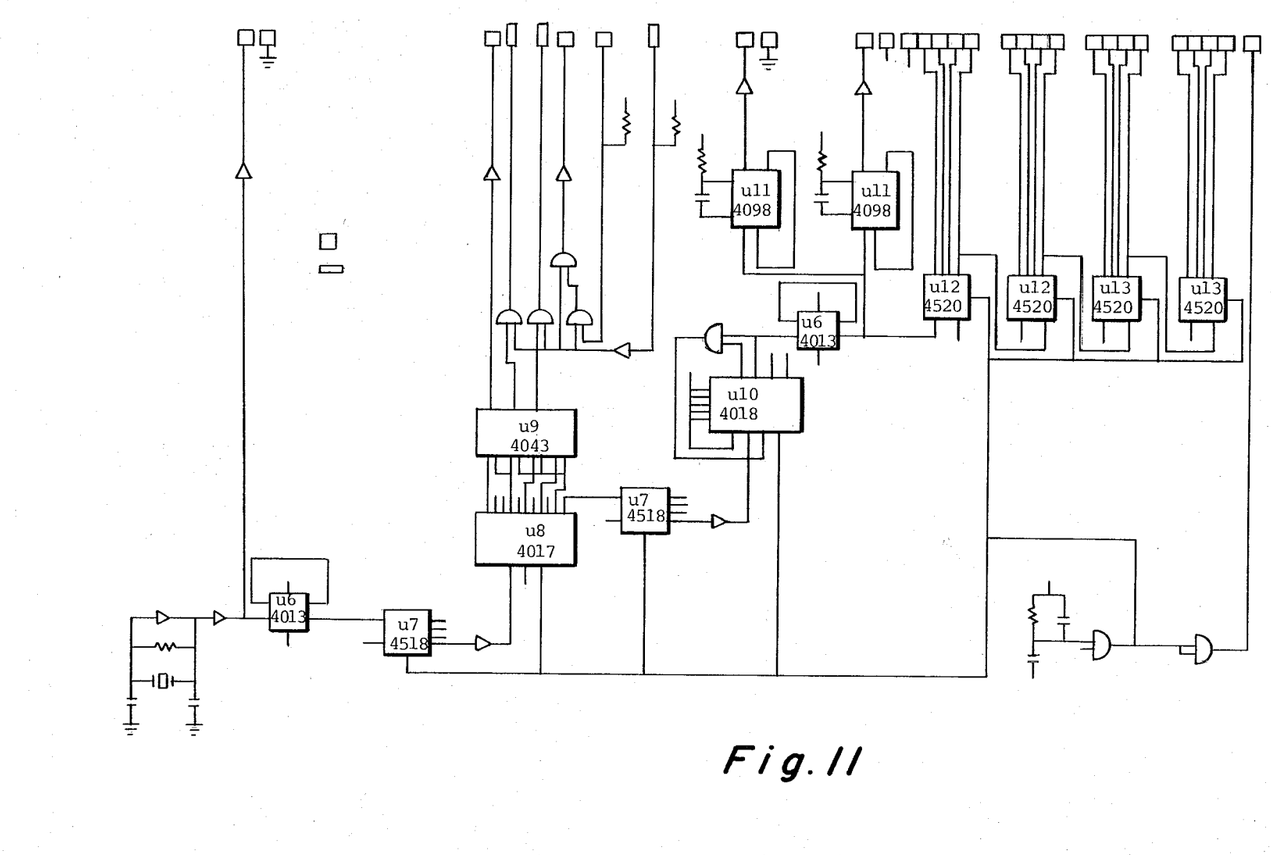
FIG. 11 illustrates in block diagram form one embodiment of the means affording basic clock control for the system.
Figure 12:
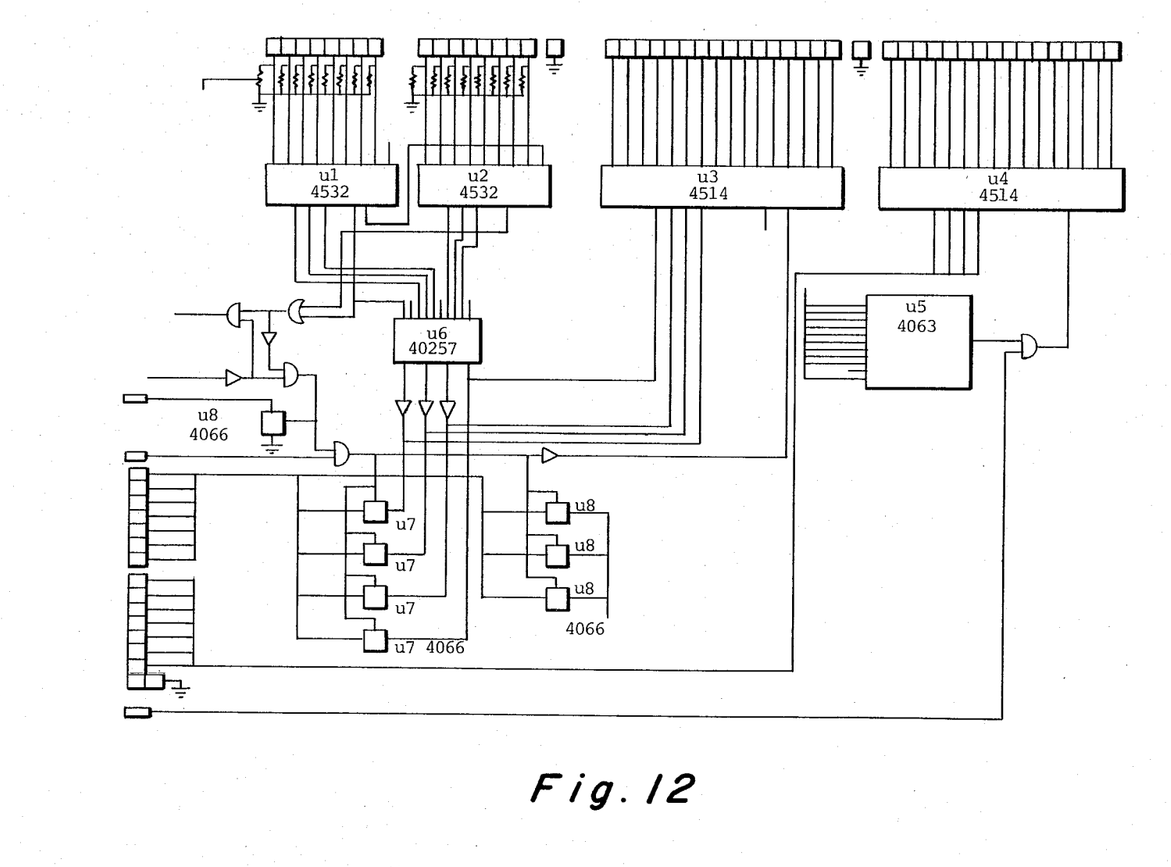
FIG. 12 illustrates one embodiment of the means providing logic for priority encoding and message detection in the base.

The two other boards in the illustrated embodiment are the Bus Generator (FIG. 11) and the Bus Module boards (FIG. 12). The Bus Generator board provides the 2MHz basic clock signal to the system. It is crystal-controlled and provides four control signals to the system at a 10-KHz bus message rate: latch request; source; destination; and transfer pulse. It also provides the ADC sample command pulse to the system at 100 per second, a 16-bit time code number (the value at a 16-bit counter at 100 per second which is referenced once per second to the external timing system), and master reset. The Bus Module board provides the logic for priority encoding and message detection on the bus.

The system is powered by a 25-watt 12 V to +5 V DC-DC converter and a 6-watt 12 V to ±12 V DC-DC converter. The power requirement of each microcomputer system is about 1 watt. One 12 V automobile battery can run the system for at least 1 day, depending upon the activity level.

OPERATION

Upon initiation, the operator provides values for the sampling rate, number of stations, and the coordinates of each station, as well as a time correction value for each station. Level 1, Level 2, and WORKER parameters are shown in Table 1 (FIG. 13) with their default values. The operator selects the desired modes any or all of which may be used. Finally, the user may select a shortened version of printout.

At any time any of the values may be changed. The usual procedure is to start out with all modes operating until the rate of earthquake activity is determined. At that time, stations may be moved, the velocity model modified, and/or processing changed. In any case, the system offers flexibility in field procedures by providing the user with results during the experiment, in a real-time mode.

In one working embodiment, the system utilizes the RCA 1802 CMOS Microprocessor with a DEC LSI-11/23 processor as the MASTER computer for data analysis. Systems configurations range from 8 to 127 channels. The following components are provided:

MASTER

LSI-11/23 processor with floating point hardware and 100K Bytes of Memory Dual Tape Cartridge Drive
Interfaces:
    Serial Data-Boss
    Tape Drive
    CRT Terminal
    Printer
Software: FORTRAN IV
    BOSS
RCA 1802 CMOS Microprocessor
8K Bytes EPROM
8K Bytes RAM
Interfaces:
    System Bus
    Real-Time Clock
    Serial Data-LSI-11/23
Software: RCA Machine Code
WORKER
RCA 1802 CMOS Microprocessor
12K Bytes EPROM
4K Bytes RAM
Interfaces:
    System Bus
    12Bit A/D converter with Sample & Hold, 50 Hz anti-alias filter, 5 V full scale analog input range, operating at 100 samples/second
Software: RCA Machine Code
STANDARD PERIPHERALS
Real-time clock
48 column thermal printer
Dual-cartridge tape drive
CRT terminal
PACKAGING
Standard 19 inch equipment enclosure
48 inch high for 8 channel system
Double wide, 36 inch high for 15 channel system
SYSTEM POWER CONSUMPTION
Approximately 1 watt per channel during event detection
Approximately 75 watts peak, 50 watts average, during event analysis (less than one minute per event)
DATA RETRIEVAL SYSTEM
Portable system prints selected events
Packaging: 16"×9"×15" aluminum case
Power: 50/60 Hz, 110/220 VAC

What is claimed is:

1. A method for detecting a valid seismic event, which comprises the steps of
    (a) continuously monitoring in dedicated WORKER PROCESSORS each of a plurality of physically separated stations a seismic signal (X) corresponding with the ambient seismic background level, including the steps of
(1) digitizing the seismic signal and removing the mean therefrom to produce a first time series $(X(t_i))$;
(2) computing from the first time series a new time series in accordance with the formula:

$$X'(t_i) = \frac{\sum_{j=i-n}^{i} |X(t_j)|}{n};$$

(3) forming long-term (LTA) and short-term (STA) averages of the new time series $(X'(t_i))$; and
(4) producing a first abnormal-condition trigger signal when the ratio of short term average to long term average exceeds a first given value $(C_1)$;

(b) determining, in response to said trigger signal, the first time of onset (PT) of the first abnormal condition;

(c) processing a primary segment (P) of said first time series($X(t_i)$) beginning at the onset time (PT) to determine amplitude (PA), quality (PQ), and polarity (PP) values, said primary segment being subsequently Fourier transformed to produce primary arrival spectral estimates of low-frequency level, corner-frequency value, and high-frequency slope;

(d) producing a second abnormal-condition trigger signal when the ratio of short term average (STA) to the P-amplitude (PA) exceeds a second given value $(C_3)$;

(e) determining, in response to said second trigger signal, the second time of onset (ST) of the second abnormal condition;

(f) processing a secondary segment (S) of said first time series $(X(t_i))$ beginning at the second onset time (ST) to determine amplitude (SA) and quality (SQ) values, said secondary segment being subsequently Fourier transformed to produce secondary arrival spectral estimates of low-frequency level, corner-frequency value, and high-frequency slope;

(g) monitoring in a BOSS processor (2) the status of the dedicated WORKER processors to determine, upon the occurrence of a first abnormal-condition trigger signal in any one thereof, whether or not the first abnormal condition indicates a valid seismic event, including the step of determining whether a sufficient number of onset times (PT) are received during a given time window (TW);

(h) aborting, when the WORKER abnormal conditions are not a valid seismic event, the processing sequences underway in the various WORKER processors;

(i) collecting in the BOSS processor, when the WORKER abnormal conditions represent a valid seismic event, all the values computed by the WORKERS for the event, and returning the WORKER processors to their initial monitoring status; and (j) transmitting the values collected in the BOSS processor to a MASTER computer for processing the valid seismic event.

2. The method as defined in claim 1, and further including the step of automatically processing the values in the MASTER computer to calculate at least one of seismic event parameters including event location, accumulative event count, event distribution characteristic (b-value), stress drop, source dimensions, amount of fault slip, ratio of P- and S- velocities, and the components of the moment tensor.

3. The method as defined in claim 2, and further including the step of recording the processing results of the MASTER computer.

4. Apparatus for detecting a valid seismic event, which comprises (a) a plurality of WORKER processor means (4,6) each operable to monitor at a physically separated station a seismic signal (X) corresponding with the ambient seismic background level, said WORKER processor means including means digitalizing the seismic signal and for removing the mean therefrom to produce a first time series $(X(t_i))$, means for computing from the first time series a new time series $(X'(t_i)$ in accordance with the formula:

$$X'(ti) = \frac{\sum_{j=i-n}^{i} |X(tj)|}{n}$$

means for forming long-term (LTA) and short-term (STA) averages of the new time series $(X'(t_i))$; and means producing a first abnormal-condition trigger signal when the ratio of short term average to long term average exceeds a first given value $(C_1)$;

(b) means for determining, in response to said trigger signal, the first time of onset (PT) of the first abnormal condition;

(c) means for processing a primary segment (P) of said first time series $(X(t_i))$ beginning at the onset time (PT) to determine amplitude (PA), quality (P), and polarity (PP) values, said primary segment being subsequently Fourier transformed to produce primary arrival spectral estimates of low-frequency level, corner-frequency value, and high-frequency slope;

(d) means for producing a second abnormal-condition trigger signal when the ratio of short term average (STA) to the P-amplitude (PA) exceeds a second given value $(C_3)$;

(e) means for determining, in response to said second trigger signal, the second time of onset (ST) of the second abnormal condition;

(f) means for processing a secondary segment (S) of said first time series $(X(t_i))$ beginning at the second onset time (ST) values, said secondary segment being subsequently Fourier transformed to produce secondary arrival spectral estimates of low-frequency level, corner-frequency value, and high-frequency slope;

(g) BOSS processor means (2) for monitoring the status of the dedicated WORKER processors to determine, upon the occurrence of a first abnormal-condition trigger signal in any one thereof, whether or not the first abnormal condition indicates a valid seismic event, including the step of determining whether a sufficient number of onset times (PT) are received during a given time window (TW);

(h) means for aborting, when the WORKER abnormal conditions are not a valid seismic event, the processing sequences underway in the various WORKER processors;

(i) means for collecting in the BOSS processor, when the WORKER abnormal conditions represent a valid seismic event, all the values computed by the WORKERS for the event, and returning the WORKER processors to their initial monitoring status;

(j) and means for transmitting the values collected in the BOSS processor to a MASTER computer for processing the valid seismic event.

* * * * *